United States Patent [19]
Martin et al.

[11] Patent Number: 5,373,360
[45] Date of Patent: Dec. 13, 1994

[54] METHOD AND APPARATUS FOR REDUCING ROTATIONAL BIAS IN A RING LASER

[75] Inventors: Graham Martin, Woodland Hills; Salim Jabr, Mountain View, both of Calif.

[73] Assignee: Litton Systems, Inc., Woodland Hills, Calif.

[21] Appl. No.: 619,703

[22] Filed: Nov. 9, 1990

[51] Int. Cl.$^5$ .......................... G01B 9/02; H01S 3/08
[52] U.S. Cl. ...................................... 356/350; 372/94
[58] Field of Search .................. 356/350; 372/94, 108

[56] References Cited

U.S. PATENT DOCUMENTS

| | | |
|---|---|---|
| 3,480,878 | 11/1969 | Macek . |
| 3,867,034 | 2/1975 | Aronowitz . |
| 4,141,651 | 2/1979 | Smith et al. . |
| 4,449,824 | 5/1984 | Matthews . |
| 4,886,364 | 12/1989 | Ljung . |

*Primary Examiner*—Stephen C. Buczinski
*Attorney, Agent, or Firm*—Poms, Smith, Lande & Rose

[57] ABSTRACT

Method and apparatus for reducing rotational bias error in a ring laser. The method includes the steps of varying a portion of an optical path for laser beams that emerge from a ring laser cavity along divergent paths and are subsequently combined along a common path to a detector. The apparatus of one embodiment includes a movable mirror positioned to intercept the laser beams emerging from the ring laser cavity before combination along a common path. The movable mirror may be piezo-electric transducive elements configured to bend on application of a voltage. The piezo-electric elements are provided with a reflective region that is positioned to redirect the laser beams from the ring laser back to an output coupling mirror so that re-reflection from the output mirror redirects the laser beams back into a beam combining optical element. In an alternative embodiment the detector is periodically displaced along an access parallel to the common path of the laser beam. In this embodiment piezo-electric elements are disposed between the beam combining optic and the detector to periodically displace the detector.

19 Claims, 2 Drawing Sheets

FIG. 3
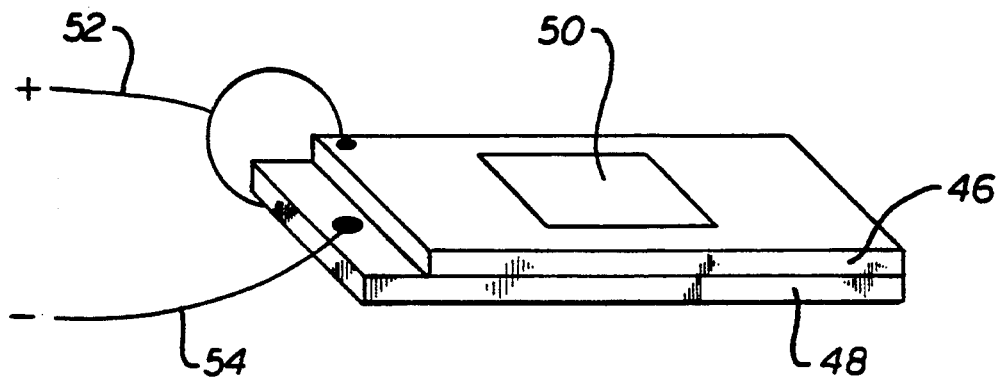
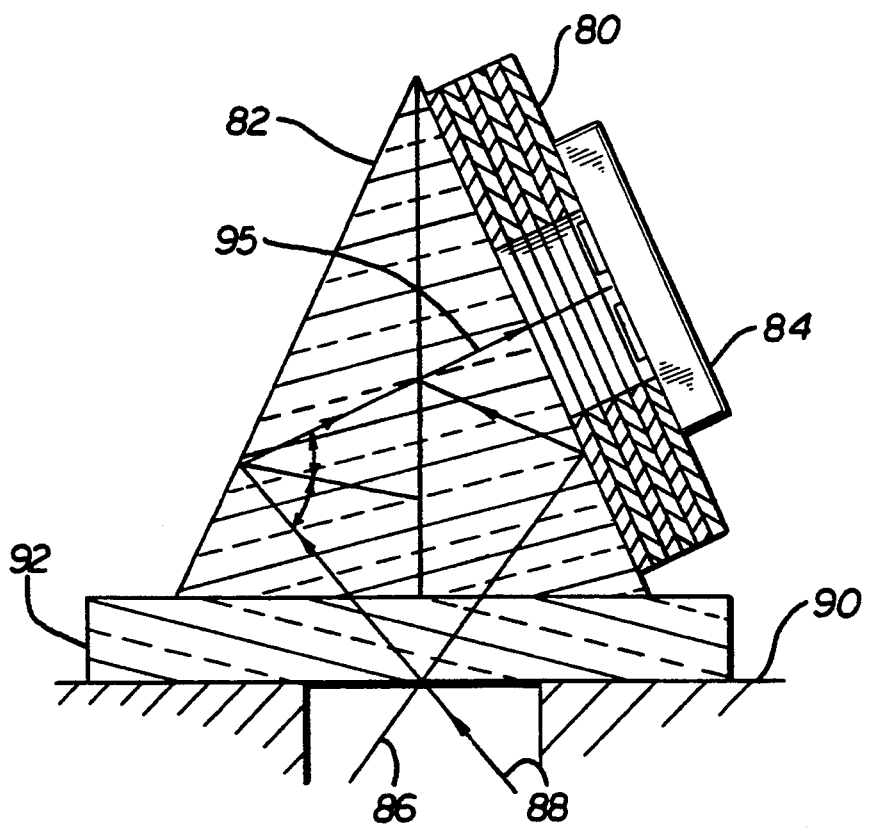
FIG. 4

METHOD AND APPARATUS FOR REDUCING ROTATIONAL BIAS IN A RING LASER

BACKGROUND OF THE INVENTION

The present invention generally concerns ring lasers and, more particularly, apparatus and methodology for reducing rotational bias errors in ring lasers.

Ring lasers have become widely used in applications related to the measurement of rotational motion and acceleration. A ring laser typically forms a closed polygonal optical path within which two or more laser beams propagate in opposite directions. This closed optical path may either be flat or, alternatively, non-planar. The ring laser has a sensing axis that passes through the closed optical path of the counter-propagating beams. For a flat, or planar, ring laser this axis is normal to the closed optical path. In non-planar ring laser configurations, the sensing axis may be a line normal to the projection of the optical path upon a plane.

When the ring laser is not rotating about the sensing axis, the optical paths of the counter-propagating beams have identical lengths. Rotation of the ring laser about the sensing axis, however, causes the effective path length to increase for the laser beams travelling in the direction of the rotation while the path length for the laser beams travelling in the opposite direction, counter to the sense of rotation, effectively decreases. This effective shift in the optical path lengths of the counter-propagating laser beams in the ring laser induces a measurable shift in the frequency of each of the beams. Thus rotational motion and acceleration of the ring laser about the sensing axis can be determined by measurement of these shifts in frequencies. To effectuate this measurement, a portion of each counter-propagating laser beam is typically extracted from the closed optical path of the ring laser. Beam combining optics are then employed to direct both beams co-linearly along a common path to a detector that senses a beat frequency resulting from the frequency shifts.

One major difficulty previously experienced in ring lasers is the disappearance of the frequency difference between the counter-propagating beams within the ring laser when the rotation rate of the ring laser is within certain limits. At low rotation rates this loss of frequency difference can produce a false indication that the ring laser is not rotating. Called lock-in, this effect arises from an optical coupling of photons between the counter-propagating beams within the ring laser. This coupling can result from backscatter of a portion of each beam off the mirrors defining the closed optical path of the ring laser. Each laser beam within the ring laser cavity thus includes a small component having the frequency of the beam propagating in the opposite direction, causing the resultant frequency of each of the laser beams to shift towards, or lock-in, the resultant frequency of the other counter propagating beam. At sufficiently low rates of ring laser rotation, the two counter-propagating laser beams are at the same frequency and lock-in occurs.

Lock-in has been substantially reduced with the development of ring lasers generally called multi-oscillator type ring lasers. In multi-oscillator ring lasers, a non-planar laser cavity is employed to obtain four laser modes from two pairs of counter-propagating beams. One of the pairs of counter-propagating beams is left circularly polarized, while the other pair of counter-propagating laser beams is right circularly polarized. Thus one of the left circularly polarized laser beam travels about the ring laser cavity in a clockwise direction with respect to the sensing axis of the ring laser while the other left circularly polarized laser beam travels about the ring laser cavity in an opposite, or anti-clockwise direction. Similarly, one of the right circularly polarized beams also travels about the ring laser cavity in a clockwise direction while the other at the right circularly polarized laser beams travels in an anti-clockwise direction. The frequency of the left circularly polarized pair of laser beams also differs from the frequency of the right circularly polarized pair of beams. In one type of multi-oscillator type ring laser, a Faraday element is also included in the optical path within the ring laser cavity to reduce sensitivity to lock-in. Application of a magnetic field to the Faraday element induces a slight frequency separation between the two counter-propagating left circularly polarized laser beams and between the two counter-propagating right circularly polarized beams. This frequency separation shifts the lock-in region to rates of rotation greater than those rates that are usually of interest.

Split gain ring lasers similarly employ a non-planar cavity configuration to obtain two pairs of left circularly polarized and right circularly polarized counter-propagating laser beams. The split gain ring laser, however, does not require a Faraday element to achieve a frequency separation between the two counter-propagating beams. Instead the gain curve of the split gain laser is divided into two separate maxima by application of a magnetic field to a plasma discharge region of the ring laser cavity. Each maxima of the gain curve will then amplify, or support lasing, in modes of only one helical orientation. For example, a left circularly polarized laser beam propagating in the anti-clockwise direction about the ring laser cavity has the same helical orientation as a right circularly polarized laser beam propagating in the clockwise direction. Thus one of the maxima of the gain curve for a split gain ring laser will amplify only the anti-clockwise propagating left circularly polarized laser beam and clockwise propagating right circularly polarized laser beam while the other maxima will only amplify the left circularly polarized laser beam propagating clockwise and the right circularly polarized beam propagating anti-clockwise. The strength of the magnetic field and, therefore, the range of frequencies within each maxima of the gain curve, can then be selected to support lasing at two separate longitudinal modes within the free spectral range of the ring laser cavity. This magnetic field strength is usually chosen to provide a frequency splitting of the two portions of the gain curve equal to the free spectral range of the ring laser cavity. Thus the anti-clockwise propagating left circularly polarized and clockwise propagating right circularly polarized laser beams will be of a different longitudinal mode from the clockwise propagating left circularly polarized and anti-clockwise propagating right circularly polarized laser beams. The resulting laser beam modes within the split gain ring laser are thus separated in frequency either by the longitudinal mode spacing of the ring laser cavity or by the geometrically induced reciprocal splitting of the laser cavity configuration. This frequency separation greatly reduces the susceptibility of the split gain ring laser to lock-in, even in comparison with multi-oscilator type ring lasers incorporating a Faraday element, and avoids the complications associated with placement of a Faraday element in the ring laser cavity.

The split gain ring laser is the subject of a co-pending patent application entitled "Split Gain Multi-Mode Ring Laser Gyroscope And Method" (inventor Grahm Martin), Ser. No. 07/115,018 filed Oct. 28, 1987. This co-pending application has been assigned to Litton Corporation, the assignee of the current application, and is under a secrecy order (Type I).

While the split gain ring laser enjoys less susceptibility to lock-in, other forms of rotational bias error have begun to predominate as limitations in the accuracy of the laser. One source of rotational bias error is caused by the re-injection back into the ring laser cavity of a small portion of each of the laser beams that are coupled out of the laser for beat frequency measurement. Re-injection of a portion of a laser beam mode back into the ring laser cavity in the same clockwise or anti-clockwise direction as the initial laser beam mode can induce a frequency shift in that mode within the ring laser cavity and, thus, can inject an error in the beat frequency measured by the detector. Accordingly, there still exists a need to reduce or eliminate such rotational bias errors. The present invention fulfills this need.

SUMMARY OF THE INVENTION

Broadly, and in general terms, the present invention provides a method and apparatus for substantially reducing rotational basis error in ring lasers resulting from the light scattering sources external to the ring laser cavity. The method and apparatus of the present invention, while particularly suited for split gain, geometrically biased ring lasers, may also be used in connection with other ring laser configurations, such as planar ring lasers. More specifically, the methodology of the present invention includes the steps of periodically varying the optical path length of each laser beam extracted from the ring laser cavity at a rate greater than the sampling rate of a detector sensing the beat frequency of the two laser beams. The optical path length that is being modulated is exterior to the ring laser cavity, between a ring laser output mirror and the detector. A periodic variation in this optical path length is advantageously, though not necessarily, induced in a portion of the optical path before combination of the laser beams from the ring laser cavity along a single path.

One presently preferred embodiment of the apparatus of the present invention includes alterations in the configuration of the optical beam combining elements that redirect the laser beams from the ring laser cavity along a common, co-linear path to the detector. These beam combining elements are reconfigured to accommodate a movable mirror that is disposed in the optical path of each of the laser beams emerging from the ring laser cavity. In one presently preferred embodiment, the beam combining elements include a pair of right angle prisms that are bonded together along sides opposite their respective hypotenuse, with the common bonded sides of the prisms oriented generally perpendicular to the reflective plane of the ring laser output mirror. Each prism is provided with a groove along a second side of the prism within which the movable mirror is disposed. This mirror may be formed from a pair of piezo-electric transducive elements having a reflective surface on one side. The movable mirror reflects the counter-propagating laser beams emerging from the ring laser cavity back toward the ring laser output mirror where the beams are again reflected back into the beam combiner and oriented along a common path to the detector. In this presently preferred embodiment, the change in the optical path length of the two beams from the ring laser are periodically varied before the beams are combined along a common co-linear path.

In an alternative embodiment of the apparatus of the present invention, rotational bias error is substantially reduced by periodically displacing the laser beam sensing detector along an axis parallel to the propagation axis of the laser beams from the ring laser cavity after the laser beams have been combined along a single path. In this embodiment, piezo-electric transducive elements are disposed between the beam combiner and the detector so as to periodically displace the detector at a rate greater that the sampling rate of the detector. This embodiment is also readily adaptable to a variety of optical beam combiner configurations although only rotational bias error resulting from scatter off of the detector is diminished with this approach.

The novel features of the present invention will be better understood from the following detailed description, considered in connection with the accompanying drawings. It should be understood, however, that the drawings are for purposes of illustration and description only and are not intended as a definition of the limits of the present invention.

BRIEF DESCRIPTION OF THE DRAWINGS

FIG. 3 is a perspective view of the movable mirror from the first embodiment illustrated in FIGS. 1 and 2; and FIG. 4 is a sectional side view of a second embodiment of the apparatus of the invention.

DETAILED DESCRIPTION OF THE PREFERRED EMBODIMENTS

Figure 1:
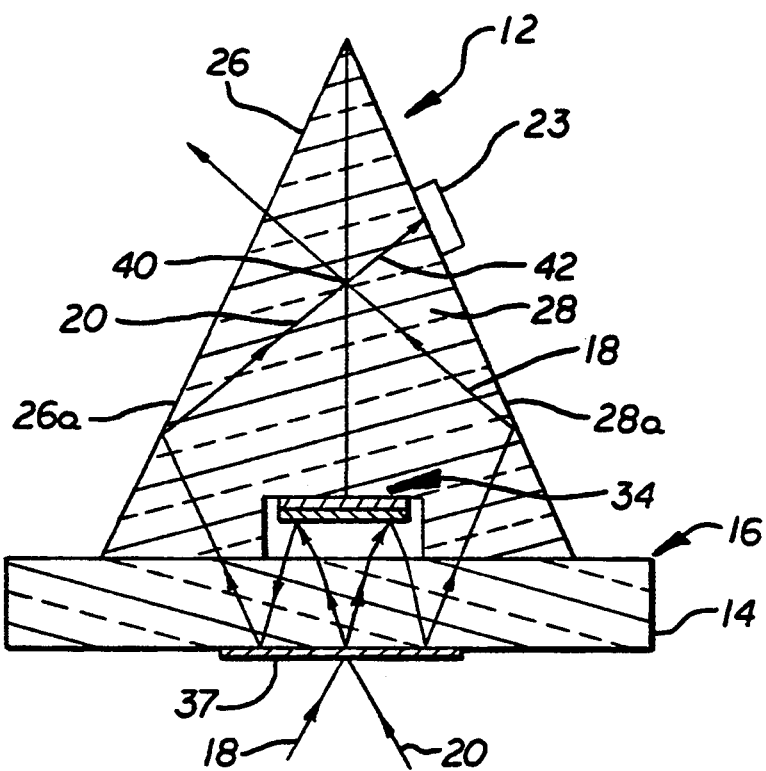
FIG. 1 is a sectional side view of one presently preferred embodiment of the apparatus of the present invention.

Referring to the figures, and more particularly FIG. 1, there is shown one presently preferred embodiment of the apparatus of the present invention. As illustrated, a beam combiner 12 is mounted on a substrate 14 of an output mirror 16 for a ring laser cavity (not shown). The beam combiner 12 intercepts counter-propagating laser beams 18 and 20 emerging from the ring laser cavity along divergent paths and redirects the laser beams 18 and 20 along a common path to a detector 23. Rotation of the ring laser cavity is sensed by measurement of a beat frequency between the beams 18 and 20 with the detector 23.

Figure 2:
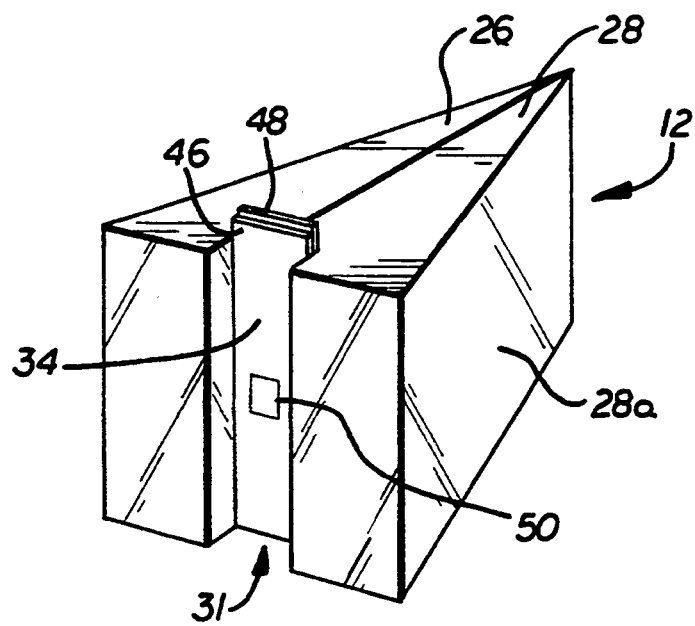
FIG. 2 is a perspective view of the embodiment illustrated in FIG. 1.

As shown in FIGS. 1 and 2, the beam combiner 12 is formed from two right angle prisms 26 and 28 bonded together along common sides opposite the respective hypotenuse 26a and 28a of each prism 26 and 28. In this embodiment each prism 26 and 28 further defines a groove 31 to accommodate a movable mirror 34. The position and orientation of the movable mirror 34 is selected to intercept the laser beams 18 and 20 emerging from the ring laser cavity and provide a periodic variation in the optical path between the output mirror 16 and the detector 23 when the movable mirror 34 vibrates.

A better understanding of the current invention can be obtained by an explanation of the optical path travelled by the laser beams 18 and 20 from the ring laser cavity to the detector 23. Within the ring laser cavity, the counter-propagating beams 18 and 20 are partially reflected and partially transmitted through a reflexive coating 37 on the mirror substrate 14. The partially transmitted portions of the laser beams 18 and 20 then travel through the mirror substrate 14 and the gap 31 in the beam combiner 12 to the movable mirror 34. These transmitted portions of the laser beams 18 and 20 are then reflected off of the movable mirror 34 along a path leading back into the mirror substrate 14 where the beams 18 and 20 reflect off a rearward, or internally facing, surface of the mirror coating 37. The paths of the laser beams 18 and 20 separately lead back into the beam combiner 12 where laser beam 18 is reflected off of the hypotenuse 28a of prism 28 and laser beam 20 is reflected off of the hypotenuse 26a and prism 26. After these respective reflections, the laser beams 18 and 20 are directed along separate paths to a common interception point 40 on the bonded sides of the prisms 26 and 28. At this common interception point 40 a portion of each laser beam 18 an 20 is directed along a common path 42 through prism 28 to the detector 23. Thus, for example, laser beam 20, travelling through the prism 26, is partially transmitted through the bonded sides of the prisms 26 and 28 at the common interception point 40 into the prism 28 along the common path 42 to the detector 23. Another portion of the laser beam 20 is also partially reflected off of the bonded sides of the prisms 26 and 28 and back into the prism 26 along a second path 44 which, in this preferred embodiment, is not further utilized. The bonded sides of the prisms 26 and 28 are preferably coated so that these sides, in combination, form a beam splitter. In the presently preferred embodiment the coatings are selected so that the bonded sides of prisms 26 and 28 form a fifty percent reflective and fifty percent transmissive beam splitter.

Laser beam 18, travelling through the prism 28, is similarly reflected off of the hypotenuse 28a toward the common interception point 40 where a portion of laser beam 18 is partially reflected along the same path 42, in prism 28, as the transmitted portion of laser beam 20. Thus portions of each of the counter-propagating laser beams 18 and 20 divergently emerging from the ring laser cavity are multiply reflected along an optical path that includes a reflection off of the movable mirror 34 and combined along a combination path 42 leading to the detector 23.

Each reflection of the laser beams 18 and 20 after partial transmission through the mirror coating 37 reflects a small percentage of photons from the laser beams 18 and 20 back into the ring laser cavity. The reflection of photons from the laser beam 18, for example, back into the ring laser cavity in the same direction of propagation as the portion of laser beam 18 remaining within the ring laser cavity, however, can induce a rotational bias error in the ring laser output. The applicants have determined that the effect of this bias error can be substantially reduced when the external optical path of the laser beams 18 and 20, between the ring laser mirror 16 and the detector 23, is rapidly varied by an amplitude of several wavelengths of the laser beams 18 and 20. Thus applicants view as part of their invention the method of reducing rotational bias error in a ring laser by periodically varying this external optical path length. The time dependency of this variation is preferably, though not necessarily, sinusoidal or sawtooth, and is at a rate that is preferably much greater than the sampling rate of the detector 23. In the presently preferred embodiment, the external optical path of the laser beams is varied in a portion of the path before the laser beams are combined along a common path. Applicants believe this approach provides an optimal minimization of all potential sources of rotational bias error arising from external scattering. Alternatively, however, variation of the external optical path of the laser beams 18 and 20 in a portion of the optical path after the laser beams are combined along a single path can still be employed to reduce rotational bias error from subsequent reflections of the combined laser beams.

In the preferred embodiment illustrated in FIGS. 1 and 2, variation in the external optical path of the laser beams 18 and 20 is provided by the movable mirror 23 before the laser beams 18 and 20 are combined along the common optical path 42. The position of the movable mirror 23 with respect to the beam combiner 12 provides a change in the optical path length of photons reflected from the common optical path 42 back into the ring laser cavity that is four times the actual physical displacement of the movable mirror 23. Thus, for example, physically displacing the movable mirror 23 ten wavelengths of the laser beams 18 and 20 along an axis normal to the plane of the movable mirror 23 induces a forty wavelength change in the optical path length of photons reflected from the common optical path 42 back into the ring laser cavity.

In the preferred embodiment illustrated in FIGS. 1 and 2 a piezo-electric bimorph is used as the movable mirror 34. As shown in FIG. 3, this bimorph is formed from two generally rectangular wafers 46 and 48 of piezo-electric material bonded together with conductive epoxy. Piezo-electric materials suitable for this use include, but are not limited to, lead titanate zirconate and barium titanate in sintered form. A reflective surface 50 is provided on a portion of an exposed side of the wafer 46 as an active mirror region for reflection of the laser beams 18 and 20. This surface 50 preferably has a reflectance of at least ninety percent and may be formed by application of a metallic coating onto the exposed side of wafer 46 or by bonding a thin highly polished metal sheet to the wafer 46.

To facilitate electrical interconnections, the piezo-electric wafers 46 and 48 have slightly differing lengths. As shown in FIG. 2, the lengths of both wafers 46 and 48, however, preferably exceed the length of the groove 31 in the beam combiner 12 so as to accommodate leads 52 and 54 extending from the wafers 46 and 48. The assembly of the wafers 46 and 48 is preferably bonded to the beam combiner 12 along the exterior edges of the gap 31 to accommodate flexure of the wafers 46 and 48 in the middle region of the beam combiner 12. The plane formed by the reflective surface 50 is preferably parallel to the base surface of the beam combiner 12 to within one minute of arc. This parallel orientation can be obtained by auto-collimating the base surface of the beam combiner 12 and the reflective surface 50 when the movable mirror 34 is bonded to the beam combiner 12.

In operation, application of a few tens of volts across the wafers 46 and 48 causes the movable mirror 34 to bow and displaces the position of a central portion of the reflective surface 50 with respect to the beam combiner 12. As noted above, the change in the external optical path length of photons backscattered from the common optical path 42 of the laser beams 18 and 20 is four times the actual displacement of the reflective surface 50 itself.

In FIG. 4 an alternative embodiment of the present invention is shown. In this embodiment the primary source of reflection back into the ring laser cavity, the detector, is periodically displaced along an axis parallel to the common path of the laser beams extracted from the ring laser cavity after the laser beams are directed along a common path by the beam combining optics. While this approach does not minimize all sources of backscatter-induced rotational bias error, it does provide a substantial reduction in rotational bias error and is applicable to a variety of ring laser configurations.

As shown in FIG. 4, a stack of piezo-electric elements 80 are disposed between an optical beam combiner 82 and a detector 84. Counter-propagating laser beams 86 and 88 within a ring laser cavity 90 (partially shown) are partially transmitted through a ring laser output mirror 92 and directed along a common path 95 by multiple reflections within the beam combiner 82. In operation, application of a periodic voltage across the piezo-electric elements 80 causes a rectilinear displacement of the detector 84 along an axis parallel to the common path 95 of the laser beams 86 and 88. This movement of the detector 84 will not affect the output signal of the detector. As in the previous embodiment, the time dependency of the periodic voltage applied to the piezo-electric elements 80 is preferably a sinusoidal, function of time. The rate of fluctuation is also preferably greater than the sampling rate of the detector 84.

The present invention provides a unique method and apparatus for reducing one of the sources of rotational bias error. Application of the preferred method of the present invention is simple and the two embodiments discussed above are also relatively inexpensive to implement. It will, of course, be understood that modifications to the above-described invention will be apparent to others skilled in the art. For example, materials other than the piezo-electric wafers 46 and 48 discussed above could be used to form the movable mirror 34. The entire exposed surface of the piezo-electric wafer 46 could also be provided with a reflective coating rather than the localized region that actually reflects the laser beams 18 and 20 from the ring laser. Additionally, it should be expressly understood that incorporation of a movable mirror, such as the mirror 34, is not limited to the specific type of beam combiner 12 illustrated in FIG. 1. A movable mirror such as moveable mirror 34 could similarly be incorporated into a variety of different beam combiner configurations to vary the external optical path length of laser beams extracted from the ring laser cavity without departing from the scope or spirit of the present invention. Accordingly, the scope of the present invention is not limited by the particular embodiments or the description presented above, but is defined only by the claims set forth below, and equivalents thereof.

What is claimed is:

1. An output coupler for a ring laser having reduced rotational bias error, comprising:
    optical means, attached to an output mirror of the ring laser, for combining laser beams emerging from the ring laser along divergent paths;
    detector means, coupled to the optical means in the path of the combined laser beams, for sensing the combined laser beams; and
    means for varying an optical path length of the laser beams from the ring laser between the ring laser output mirror and the detector means, wherein rotational bias error in the ring laser is reduced by periodically varying optical path lengths of the laser beams from the ring laser cavity between the ring laser output mirror and the detector means.

2. The output coupler of claim 1 wherein said optical combining means includes a pair of right angle prisms bonded together along sides opposite their respective hypotenuse, each prism forming a groove along a base of the prism adjacent the bonded surface.

3. The output coupler of claim 2 wherein the optical path length varying means includes a piezo-electric transducive element, disposed within the groove between said prisms, having a reflective surface oriented away from the prisms.

4. The output coupler of claim 2 wherein the reflective surface of the piezo-electric transducive element is a thin metallic sheet.

5. The output couple of claim 3 wherein the piezo-electric transducive element has a length exceeding a width of the bonded prisms.

6. The output coupler of claim 3 wherein the piezo-electric transducive element is made of lead titanate zirconate.

7. The output coupler of claim 3 wherein the piezo-electric transducive element is made of barium titanate in sintered form.

8. The output coupler of claim 1 wherein the optical path length varying means is a piezo-electric transducive element disposed between the optical combining means and the detector means.

9. An output coupler for a ring laser having reduced rotational bias error, comprising:
    an optically transmissive beam combiner configured to merge laser beams emerging divergently from the ring laser along a single path and defining a groove along one surface contacting the ring laser;
    detector means, coupled to the beam combiner, for sensing the combined beam; and
    piezo-electric transducive element, disposed within the beam combiner groove, having a reflective surface oriented away from the beam combiner, wherein applying a voltage to the piezo-electric transducive element varies an optical path length of the laser beams from the ring laser to the detector means and reduces rotational bias error within the ring laser.

10. The output coupler of claim 9 wherein the reflective surface of the piezo-electric transducive elements is a thin metallic sheet.

11. The output couple of claim 9 wherein the piezo-electric transducive element has a length exceeding a width of the beam combiner.

12. The output coupler of claim 9 wherein the piezo-electric transducive element is made of lead titanate zirconate.

13. The output coupler of claim 9 wherein the piezo-electric transducive element is made of barium titanate in sintered form.

14. A method for reducing rotational bias error in a ring laser having a detector for sensing counter-propagating beams emerging from the ring laser cavity, comprising the step of:
    periodically varying an optical path length of laser emerging beams from the ring laser between the ring laser cavity and the detector.

15. The method of claim 14 wherein the optical path length is varied at a point before the laser beams from the ring laser cavity are combined along a common path.

16. The method of claim 14 wherein the optical path length is varied at a point after the laser beams from the ring laser cavity are combined along a common path.

17. The method of claim 14 wherein the optical path length is periodically varied at a rate greater than the sampling rate of the detector.

18. The method of claim 14 wherein the optical path length is varied by displacing the detector parallel to the propagation axis of the combined laser beams from the laser cavity.

19. An output coupler for a ring laser having reduced rotational bias error, comprising:

means for combining beams emerging from the ring laser along divergent paths;

detector means for sensing the combined beams; and a piezo-electric transducive element, attached to the beam combining means and detector means, for varying the spacing between the detector means and the beam combining means, wherein periodic variations in said spacing alters an optical path length of beams emerging from the ring laser cavity and reduces rotational bias error in the ring laser.

* * * * *